(12) United States Patent
Luciani, Jr. et al.

(10) Patent No.: US 12,069,169 B2
(45) Date of Patent: Aug. 20, 2024

(54) MANAGING USE OF MANAGEMENT CONTROLLER SECRETS BASED ON FIRMWARE OWNERSHIP HISTORY

(71) Applicant: HEWLETT PACKARD ENTERPRISE DEVELOPMENT LP, Houston, TX (US)

(72) Inventors: Luis E. Luciani, Jr., Houston, TX (US); Douglas R. Hascall, Cypress, TX (US); Michael R. Garrett, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 273 days.

(21) Appl. No.: 17/588,620

(22) Filed: Jan. 31, 2022

(65) Prior Publication Data
US 2023/0246827 A1 Aug. 3, 2023

(51) Int. Cl.
*H04L 9/08* (2006.01)
*G06F 9/4401* (2018.01)
*G06F 21/57* (2013.01)

(52) U.S. Cl.
CPC .......... *H04L 9/0861* (2013.01); *G06F 9/4401* (2013.01); *G06F 21/57* (2013.01); *H04L 9/0891* (2013.01); *H04L 9/0894* (2013.01)

(58) Field of Classification Search
CPC ... H04L 9/0861; H04L 9/0891; H04L 9/0894; G06F 9/4401; G06F 21/57; G06F 21/572; G06F 21/575; G06F 21/79; G06F 13/4068; G06F 13/4282; G06F 21/602; G06F 21/62; G06F 21/81; G06F 2213/0026

USPC ......................................................... 713/189
See application file for complete search history.

(56) References Cited

U.S. PATENT DOCUMENTS

| | | | |
|---|---|---|---|
| 2015/0143125 A1* | 5/2015 | Nix | G06F 21/35 713/171 |
| 2022/0058270 A1* | 2/2022 | Egranov | G06F 21/572 |
| 2022/0391510 A1* | 12/2022 | Sakib | G06F 9/541 |
| 2023/0015519 A1* | 1/2023 | Khatri | G06F 21/602 |

OTHER PUBLICATIONS

Palmer, Elaine; IBM Corp.; "Ownership and Control of Firmware in Open Compute Project Devices"; Nov. 9, 2018; 8 pp.

* cited by examiner

*Primary Examiner* — Jacob Lipman
(74) *Attorney, Agent, or Firm* — Trop, Pruner & Hu, P.C.

(57) ABSTRACT

A management controller of a computer platform, determines whether an ownership history of management firmware for the management controller represents multiple owners. The management controller includes a set of one-time programmable elements that represent a first secret. The management controller manages use of the first secret based on the ownership history. The management includes, responsive to determining, by the management controller, that the ownership history represents multiple owners, generating, by the management controller, a second secret to replace the first secret. The management further includes, responsive to determining, by the management controller, that the ownership history represents multiple owners, storing, by the management controller, the second secret in a non-volatile memory and generating, by the management controller, cryptographic keys based on the second secret.

13 Claims, 6 Drawing Sheets

NON-TRANSITORY MACHINE-READABLE STORAGE MEDIUM

MACHINE-EXECUTABLE INSTRUCTIONS THAT
WHEN EXECUTED BY MACHINE, CAUSE MACHINE TO:

- CAUSE BASEBOARD MANAGEMENT CONTROLLER OF MACHINE TO DETERMINE WHETHER HISTORY OF OWNERSHIP OF FIRMWARE STORED IN BASEBOARD MANAGEMENT CONTROLLER REPRESENTS CHANGE IN OWNERSHIP FROM INITIAL OWNER TO ANOTHER OWNER OVER HISTORY OF USE OF BASEBOARD MANAGEMENT CONTROLLER, WHERE FIRMWARE CORRESPONDS TO MANAGEMENT STACK OF BASEBOARD MANAGEMENT CONTROLLER
- CAUSE BASEBOARD MANAGEMENT CONTROLLER TO MANAGE USE OF FIRST SECRET BASED ON HISTORY OF OWNERSHIP OF FIRMWARE, WHERE FIRST SECRET IS REPRESENTED BY ONE-TIME PROGRAMMABLE ELEMENTS OF MACHINE, AND MANAGING USE OF FIRST SECRET INCLUDES:
  - RESPONSIVE TO DETERMINING THAT OWNERSHIP OF FIRMWARE HAS BEEN OWNED BY FIRST OWNER OVER HISTORY WITHOUT OWNERSHIP BEING TRANSFERRED, GENERATING CRYPTOGRAPHIC KEYS BASED ON FIRST SECRET
  - RESPONSIVE TO DETERMINING THAT OWNERSHIP HAS BEEN TRANSFERRED DURING HISTORY, GENERATING CRYPTOGRAPHIC KEYS BASED ON SECOND SECRET STORED IN SECURE MEMORY

FIG. 6

MANAGING USE OF MANAGEMENT CONTROLLER SECRETS BASED ON FIRMWARE OWNERSHIP HISTORY

BACKGROUND

A computer platform (e.g., a server) may include a specialized service processor, called a "baseboard management controller," or "BMC," which, among its other potential functions, monitors the physical state of the computer platform. The BMC may communicate with a remote management server through a management network for purposes of reporting information about the computer platform to the remote management server and allowing the remote management server to control actions that are performed by the BMC. As examples of its roles, the BMC may monitor sensors (e.g., temperature sensors, cooling fan speed sensors); monitor an operating system status; monitor power statuses; log computer system events; perform remotely-controlled computer platform functions (e.g., powering up and powering down the computer platform); and so forth.

BRIEF DESCRIPTION OF THE DRAWINGS

FIG. 6 is an illustration of machine-executable instructions stored on a non-transitory machine-readable storage medium that, when executed by a machine, cause a baseboard management controller to manage the use of a secret of the baseboard management controller based on a firmware ownership history according to an example implementation.

DETAILED DESCRIPTION

Figure 1:
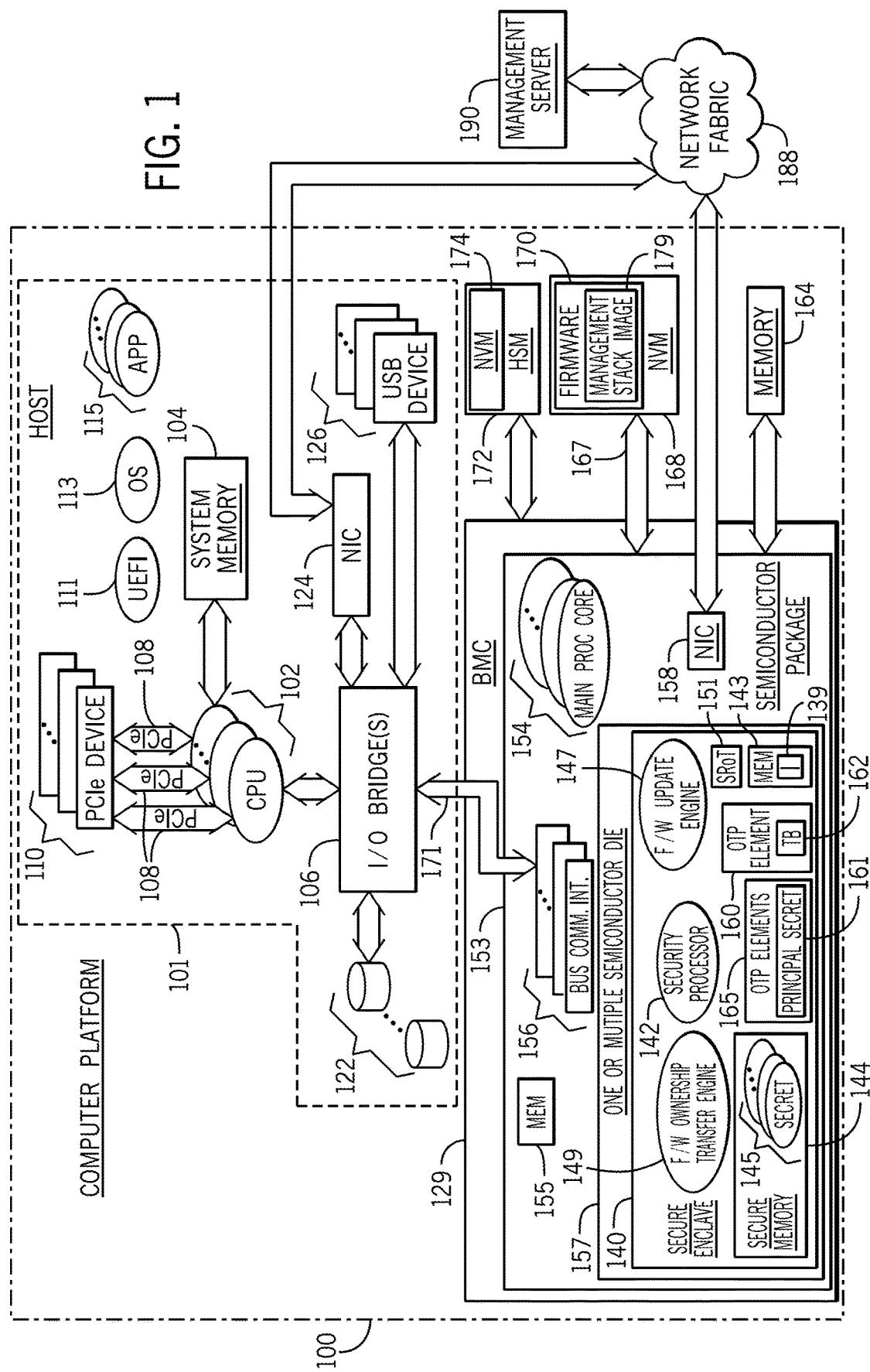
FIG. 1 is a schematic diagram of a computer platform having a baseboard management controller (BMC) that provides a firmware ownership history for the BMC's management firmware and includes features to securely transfer ownership of the management firmware according to an example implementation.

A BMC may execute a set of firmware instructions, called a "firmware management stack," for purposes of performing a variety of management-related functions for a computer platform. As examples, the BMC may provide such management-related functions as operating system runtime services, resource detection and initialization, and pre-operating system services. The management-related functions may also include remote management functions for the computer platform. As examples, the remote management functions may include keyboard video mouse (KVM) functions; virtual power functions (e.g., remotely activated functions to remotely set a power state, such as a power conservation state, a power on, a reset state or a power off state); virtual media management functions; and so forth. In addition to providing management functions for the computer platform, the BMC may provide security-related features that protect the computer platform against security compromises.

The manufacturer of the computer platform may provide a proprietary firmware management stack for the BMC. In this manner, the computer platform may be shipped with a firmware image (i.e., a collection of binary data representing a set of machine-executable instructions and data) that is stored in a non-volatile memory of the platform and corresponds to the BMC's management stack. The manufacturer is considered to be the owner of the firmware image. In this context, the "owner" of a firmware image (or "firmware") refers to the owner of the asymmetric key that is used to sign the firmware image. The signature for a firmware image allows the BMC to validate the firmware image, i.e., determine that the owner of the asymmetric key provided the firmware image and determine that the firmware image has not been altered.

More specifically, the owner of a firmware image may sign the firmware image with the private key part of the owner's asymmetric key. As an example, the signature may be the result of a hash of the firmware image encrypted with the private key part of the owner's asymmetric key. One way to validate the firmware image is for the BMC to decrypt the signature based on the public key part of the owner's asymmetric key (which is distributed via a public key infrastructure) to derive a decrypted value. The BMC may then compare a hash of the firmware image to the decrypted value to verify that the two values are the same (i.e., determine if a match occurs, which results in the firmware image being "validated").

Some computer platform customers may rely on manufacturer-owned BMC firmware, as these customers may prefer a commercial solution. Other customers may prefer to use BMC management firmware other than manufacturer-owned firmware, and accordingly, these customers may rewrite (e.g., reflash) the computer platform's firmware memory with a different firmware image. For example, a given customer may want to use the same open-source BMC firmware management stack to manage all of the customer's computer platforms, regardless of the particular manufacturers of these platforms. The open-source firmware management stack may be, as an example, firmware that is developed as part of the OpenBMC community, such as, release version 2.7 or later versions.

Issues may arise in using non-manufacturer-owned BMC management firmware. For example, a customer that uses open-source BMC management firmware may not have sufficient resources to deeply analyze all of the potential security issues that may be involved (e.g., security vulnerabilities of the firmware itself, security vulnerabilities of the firmware when used in a specific computer platform, and so forth). Moreover, using non-manufacturer-owned BMC management firmware may introduce trust issues, as the security assets, or secrets, of the BMC (and the computer platform) may be exposed to the firmware. Therefore, even if manufacturer-owned BMC management firmware is currently installed on a computer platform, the platform may not be trusted if, for example, open-source BMC management firmware was previously installed on the platform, as this other firmware had access to the BMC's secrets. Trust issues may extend to computer platforms in which the full ownership history of the BMC management firmware is unknown. For example, the full ownership history of BMC management firmware for a given computer platform may not be known when the computer platform has been refurbished and resold as a spare (e.g., a spare blade server), when the computer platform has had more than one owner, and In accordance with example implementations, a BMC of a computer platform includes and maintains a one-time programmable element (e.g., a fuse) that represents a history of BMC management firmware ownership for the computer platform. In accordance with example implementations, the one-time programmable element has one of two states: a first state to indicate that BMC management firmware owned by certain owner (e.g., the manufacturer owner) has solely been used on the computer platform; and a second state to indicate that there has been more than one owner for the BMC management firmware.

For example, in accordance with some implementations, an ownership transfer bit (called a "transfer bit" herein) of the BMC may have an initial state (e.g., a state of "0," or "unset" state, corresponding to an unblown fuse) when the BMC is first placed in production. In accordance with example implementations, as long as ownership of the BMC management firmware remains with the original manufacturer owner, the transfer bit has the same initial value. The BMC may allow non-manufacturer-owned BMC management firmware to be used. When a non-manufacturer-owned BMC firmware image is used in the computer platform (e.g., when a memory storing the manufacturer-owned firmware image is rewritten with the new firmware image), the BMC changes the state of the transfer bit (e.g., blows the fuse to impart a state of "1," or "set" state to the transfer bit) to represent, or indicate, that non-manufacturer-owned BMC management firmware has been used. In accordance with example implementations, the state of the transfer bit indicating non-manufacturer-owned firmware use cannot be reverted back to the initial state, regardless of whether manufacturer-owned firmware is reinstalled or not. Therefore, the trust of the computer platform, pertaining to whether or not non-manufacturer-owned BMC management firmware has been used, may be evaluated based on the status of the transfer bit.

In accordance with example implementations, the BMC, on each start-up, or boot, may take specific actions based on the state of the transfer bit. These actions may include actions taken by the BMC to manage the use of a principal secret based on the state of the transfer bit. The "principal secret," in this context, refers to a secret from which the BMC derives other secrets. As examples, the principal secret may be a cryptographic key or a seed. The BMC may use the principal secret as a measure to circumvent potential tampering. For example, for security purposes, the BMC may not store certain cryptographic keys in non-volatile memory that survives power loss, as a measure to prevent tampering from gaining access to the cryptographic keys. Instead of storing the cryptographic keys in a non-volatile memory, on each boot, the BMC may generate certain cryptographic keys using the principal secret as an input to various key generation algorithms. As examples, the cryptographic keys that are generated from the principal secret may include one or more of the following: keys that used to encrypt secure memory areas; transport layer security (TLS) keys; initial device identifier (IDevID) keys; keys that are passed to a Unified Extensible Firmware Interface (UEFI); keys that are used to encrypt entire non-volatile memories; keys used to encrypt configuration data store in non-volatile memory; and so forth.

In accordance with example implementations, the manufacturer encodes a principal secret for the BMC into a set of one-time programmable elements (e.g., fuses) of the BMC. The BMC management firmware may have access to this principal secret. Accordingly, there may be trust issues involved if non-manufacturer-owned BMC management firmware is or has been installed on the computer platform. In other words, for a trust standpoint, it may be assumed that the principal secret that is stored in the set of one-time programmable elements has been compromised if non-manufacturer-owned BMC management firmware was installed on the computer platform. Therefore, in accordance with example implementations, the BMC may, responsive to determining that the transfer bit has been set (indicating a transfer of firmware ownership in the present or past to a non-manufacturer owner), generate a new principal secret (to replace the principal secret stored in the BMC's one-time programmable elements). The BMC may store the newly-generated principal secret in a secure, non-volatile memory (e.g., a hardware security module (HSM); a memory of a trusted platform module (TPM); a non-volatile random access memory (NVRAM); a flash memory; a persistent memory; a set of one-time programmable elements (e.g., one-time programmable fuses and/or antifuses); and so forth). The BMC may thereafter use the principal secret that is stored in the secure memory (in lieu of the principal secret stored in the BMC's one-time programmable elements) to generate the cryptographic keys. Moreover, in accordance with example implementations, the BMC may generate a new principal secret any time ownership of the BMC management firmware is transferred from a non-manufacturer-owner to the manufacturer owner.

Referring to FIG. 1, as a more specific example, in accordance with some implementations, a computer platform 100 includes a management controller (or "service processor"), such as a BMC 129. A blade server is an example of the computer platform 100, in accordance with an example implementation. The computer platform 100 may, however, be a platform other than a blade server, in accordance with further implementations, such as a rack-mounted server, a storage array, a modular switch, a portable computer, a smartphone, a client, a desktop and so forth.

Regardless of its particular form, the computer platform 100 includes hardware that is capable of processing machine-executable instructions, and a frame, or chassis, to which the hardware is mounted. For example, the computer platform 100 may include one or multiple motherboards that may be mounted to a chassis, and each motherboard may contain one or multiple multicore CPU semiconductor packages (or "sockets" or "chips"). As an example, for implementations in which the computer platform 100 is a blade server, the blade server may have a form factor, one or multiple mechanical latches, and corresponding electrical connectors for purposes of allowing the blade server to be installed in and removed from a corresponding server blade opening, or slot, in a rack-mounted blade enclosure.

As used herein, a BMC is a specialized service processor that monitors the physical state of a server or other hardware using sensors and communicates with a management system through a management network. The BMC may also communicate with applications executing at the operating system level through an input/output controller (IOCTL) interface driver, a representational state transfer (REST) application program interface (API), or some other system software proxy that facilitates communication between the baseboard management controller and applications. The BMC may have hardware level access to hardware devices that are located in a server chassis including system memory. The BMC may be able to directly modify the hardware devices. The BMC may operate independently of the operating system of the system in which the BMC is disposed. The BMC may be located on the motherboard or main circuit board of the server or other device to be monitored. The fact that a BMC is mounted on a motherboard of the managed server/hardware or otherwise connected or attached to the managed server/hardware does not prevent the BMC from being considered "separate" from the server/hardware. As used herein, a BMC has management capabilities for sub-systems of a computing device, and is separate from a processing resource that executes an operating system of a computing device. The BMC is separate from a processor, such as a central processing unit, which executes a high-level operating system or hypervisor on a system.

In accordance with some implementations, the BMC 129 provides a management plane and a security plane, which are isolated from each other. The BMC's firmware management stack executes in the management plane. The components in the BMC's security plane, in accordance with example implementations, are isolated by a fire wall from other components of the computer platform. In this context, a "fire wall" refers to a communication barrier through which communication is tightly controlled. As an example, in accordance with some implementations, communication through the fire wall may be regulated through the use of a security services application programming interface (API).

More specifically, in accordance with example implementations, the BMC's security plane includes a secure enclave 140, and the secure enclave 140 includes a secure memory 144 that may store one or multiple secrets 145 for the computer platform 100. The secrets 145 may include secrets of a host 101 of the computer platform 100, and the secrets 145 may include secrets of the BMC 129. A "host" refers to components (e.g., one or multiple central processing unit (CPU) cores 102 and a system memory 104) of the computer platform 100, which perform at least one of providing an operating system 113 (e.g., a Linux operating system) to create an operating system environment for the computer platform 100 or providing a pre-boot environment (e.g., provide a basic input/output system (BIOS) and/or a Unified Extensible Firmware Interface (UEFI) 111) to prepare the computer platform for the operating system environment.

In accordance with example implementations, the secure enclave 140 may include one-time programmable elements 165 (e.g., a collection of fuses and/or antifuses) that may collectively indicate, or represent, a principal secret 161, which the BMC 129 uses to generate a given set of cryptographic keys on each boot of the BMC 129 (i.e., the BMC 129 may not store the generated cryptographic keys in a non-volatile memory, i.e., a memory that survives a power loss). Moreover, the secure enclave 140, in accordance with example implementations, may include a one-time programmable element 160 (e.g., a fuse or antifuse) that may indicate, or represent, the state of a BMC firmware management ownership transfer bit 162 (herein called a "transfer bit 162").

In accordance with example implementations, the BMC 129 uses the principal secret that is stored in the one-time programmable elements 165 to generate the given set of cryptographic keys responsive to the transfer bit 162 being in an initial state (e.g., an unset state). Here, the "initial state" represents that, for the firmware ownership history for the BMC 129, the manufacturer has always owned the BMC's management firmware. In accordance with example implementations, when the transfer bit 162 has a state other than the initial state (e.g., the transfer bit 162 has a set state), then the BMC 129 does not use the principal secret 161 that is encoded into the one-time programmable elements 165 to generate the given set of cryptographic keys. Instead, the BMC 129 uses a principal secret that is stored in a non-volatile memory 174 of a hardware security module (HSM) 172 that is external to the BMC 129. It is noted that, as further described herein, when the transfer bit 162 is first set to indicate the transfer of firmware ownership, the BMC 129 generates the new principal secret and stores the principal secret in the HSM 172.

As an example, the HSM 172 may be a TA100 Trust Anchor HSM semiconductor package (or "chip") that is available from Microchip, or a the HSM 172 may be a semiconductor package that is available from another manufacturer. Moreover, in accordance with further implementations, the BMC 129 may store the new principal secret in a secure, non-volatile memory other than an HSM. For example, in accordance with further implementations, the BMC 129 may store the new principal secret in the memory of a TPM or other secure processor. In accordance with further implementations, the BMC 129 may store the new principal secret in an internal secure memory of the BMC 129, such as the secure memory 144 of the secure enclave 140, another memory of the secure enclave 140, or another memory of the BMC's semiconductor package 153. In general, in accordance with example implementations, the secure, non-volatile memory in which the new principal secret is stored may be associated with any of a number of different memory technologies. As examples, the non-volatile memory may be an NVRAM, a flash memory; a persistent memory; a set of one-time programmable elements; and so forth.

In the context used herein, a "one-time programmable element" refers to a component that represents a particular bit of information, and the state of the element (i.e., the value of the associated bit) may be programmed, or changed, exactly one time. For example, the bit represented by a one-time programmable element may have an initial, unprogrammed value of "0" (i.e., the bit is "unset"). The bit may be programmed one time to change the value of the bit to "1" (i.e., "set" the bit). The programming of the bit, in accordance with example implementations, is irreversible, in that the value of the bit, once programmed (e.g., set) cannot be reversed (e.g., unset). In accordance with further example implementations, a "set" transfer bit 162 may represent that the ownership of the BMC management firmware has changed, and a "set" transfer bit 162 may represent that the ownership has never changed.

The one-time programmable element may take on any of a number of different forms, depending on the particular implementation. For example, in accordance with some implementations, the one-time programmable elements 165 that collectively represent the principal secret 161 may be a collection of semiconductor fuses and/or semiconductor antifuses of a semiconductor package 153, which contains the BMC 129. In this manner, the collection of fuses and/or antifuses may be selectively activated, or blown, by the manufacturer before the BMC 129 is placed in production, for purposes of encoding the principal secret 161 into the collection. In a similar manner, the one-time programmable element 160, in accordance with example implementations, may be a semiconductor fuse or antifuse of the semiconductor package 153. In accordance with further example implementations, the one-time programmable elements 165 may be formed by a set of non-volatile, memory locations that have an associated one-time programmable lock bit. For example, the lock bit may correspond to a fuse, which may be blown, after data representing the principal secret 161 is written to the set of non-volatile memory locations before the BMC 129 is put in production. In accordance with some implementations, the BMC 129 may include a circuit that is constructed to blow, or activate (or set), the element 160 to set the transfer bit 162 by applying a current and/or voltage that exceeds a corresponding fuse blowing threshold.

In accordance with example implementations, the BMC's secure enclave 140 is a subsystem of the BMC 129 for which access into and out of the subsystem is tightly controlled. In accordance with example implementations, the secure enclave 140 performs cryptographic functions for the computer platform 100 and is fully disposed inside a cryptographic boundary. A "cryptographic boundary" in this context refers to a continuous boundary, or perimeter, which contains the logical and physical components of a cryptographic subsystem, such as BMC components that form the secure enclave 140.

In accordance with example implementations, the secure enclave 140 includes a hardware, or silicon, Root of Trust engine 151 (herein called an "SRoT engine 151") that provides security features for the BMC 129. More specifically, in accordance with example implementations, the secure enclave 140 stores an immutable fingerprint, which is used by the SRoT engine 151 to validate portions of firmware 170 for the computer platform 100, which is stored in a non-volatile memory 168. In accordance with example implementations, the firmware 170 may include machine-readable instructions 139 that are stored in a memory 143 of the secure enclave 140 and executed by a security processor 142 of the secure enclave 140; machine-executable instructions corresponding to the BMC's management stack firmware image, which are executed by one or multiple main processing cores 154 of the BMC 129; a machine-readable instructions of a UEFI firmware image that corresponds to a UEFI 111; and so forth. In accordance with example implementations, the BMC 129 places holds on the main processing cores 154 and the security processor 142 when the BMC 129 is first powered on or reset.

Responsive to the power on or reset, the SRoT engine 151 validates and then loads an initial portion of the firmware 1 into the memory 143 of the secure enclave 140 so that this firmware portion is now trusted. The BMC 129 then releases the hold on the security processor 142 to allow the security processor 142 to boot and execute the loaded firmware instructions. By executing the firmware instructions, the security processor 142 may then validate the firmware image 179 corresponding to the BMC's management firmware stack and after validation, load the firmware image 179 into a memory 155 of the BMC 129. The instructions of the management firmware stack may then be executed by the main processing core(s) 154 (when released from reset), which causes the main processing core(s) 154 to load additional portions of the firmware 170 and place the loaded portions into a memory 164. Access to the memory 164 may involve additional training and initialization steps (e.g., training and initialization steps set forth by the DDR specification). Those instructions may be executed from the validated portion of the BMC's firmware management stack in the memory 155. In accordance with example implementations, the secure enclave 140 may lock the memory 155 to prevent modification or tampering with the validated portion (s) stored in the memory 155. Therefore, in accordance with example implementations, the chain of trust may be extended from the BMC's SRoT to the firmware management stack that is executed by the BMC's main processing cores 154.

In accordance with example implementations, the BMC 129 is constructed to prevent a given domain or entity of the BMC 129 from powering up or coming out of reset until the secure enclave 140 validates the domain/entity. Moreover, in accordance with example implementations, the BMC 129 may prevent components of the BMC 129 from accessing resources of the BMC 129 and resources of the computer platform 100 until the secure enclave 140 approves/validates the resources. The BMC 129 may perform bus filtering and monitoring (e.g., bus filtering and monitoring for an SPI bus, a system management bus (SMB), an Inter-Intergrade Component ($I^2C$) bus, an Improved $I^2C$ ($I^3C$) bus, and so forth) to prevent unwanted access to bus devices. For example, the BMC 129 may perform bus filtering and monitoring for the bus 167.

In accordance with example implementations, the security processor 142 may execute machine-readable instructions 139 (stored in the memory 143) to perform various security-related tasks for the BMC 129. For example, in accordance with example implementations, the security processor 142 may execute the instructions 139 to form a firmware update engine 147 that replaces an existing BMC management firmware image with a new BMC management firmware image. Moreover, in accordance with example implementations, the security processor 142 may execute the instructions 139 to form a firmware transfer engine 149 that is constructed to implement various security features that are described herein involved in the transfer of firmware ownership.

The main processing cores 154 may execute machine-readable instructions to perform management functions corresponding to the firmware management stack of the BMC 129. As examples, by the main processing cores 154 executing the firmware management stack, the BMC 129 may perform a variety of management roles for the host 101, such as monitoring sensors; monitoring operating system status; monitoring power statuses; logging computer system events; providing a remote console; providing remotely-controlled functions and other virtual presence technologies; and so forth.

Moreover, the execution of the firmware management stack by the main processing cores 154 may cause the BMC 129 to serve as an agent for the host 101 for purposes of allowing a management entity, such as remote management server 190, to remotely manage the host 101. The remote management server 190, depending on the particular implementation, may be physical located in another rack, blade server, data center and/or geographical location than the computer platform 100. As an example of the BMC 129 serving as an agent for the host 101 to allow remote management of the host 101, the BMC 129 may provide a remote console for the host 101 for a variety of purposes, such as providing KVM functions, virtual power functions, virtual media management functions, and so forth. The remote management server 190 may communicate with the BMC 129 via network fabric 188 even when the host 101 is powered down and even when software has not yet been installed on the host 101.

As further examples of the BMC 129 serving as an agent for the host 101, the remote management server 190 may communicate with the BMC 129 via the network fabric 188 to receive state information (e.g., temperature sensor readings, tamper sensor readings, boot status, fault indications, security check faults, and so forth) about the host 101; set up virtual media for the host 101; power up the host 101; power down the host 101; initiate a recovery action for the host 101 (e.g., initiate an operating system recovery); set a boot path for the host 101; and so forth. In accordance with example implementations, the secure enclave 140 of the BMC 129 may provide platform manifests (e.g., manifests representing integrity measurements of software components and hardware component identities) to the remote management server 190 so that the server 190 may validate the platform manifests.

In general, the network fabric 188 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

As depicted in FIG. 1, in accordance with example implementations, components of the BMC 129, such as the main processing core(s) 154 and secure enclave 140 may be disposed inside the semiconductor package 153 (or "chip"). The semiconductor package 153 may be any of numerous types of packages, such as a surface mount package, a through-hole package, a ball-grid array package, a small outline package, a chip-scale package, and so forth. Moreover, depending on the particular implementation, the components of the secure enclave 140 may be fabricated in one or multiple die 157 of the semiconductor package 153, and the management plane components of the BMC 129, such as the main processing cores 154 may be fabricated in one or multiple other die of the semiconductor package 153.

In accordance with example implementations, the host 101 may include one or multiple CPU cores 102 (e.g., CPU processing cores, semiconductor containing CPU processor cores, and so forth), and memory devices that connected to the CPU(s) 102 to form a system memory 104. The CPU cores 102 may execute machine-readable instructions to form a number of software and firmware components of the computer platform 100, such as the UEFI 111, the operating system 113, one or multiple applications 115, and so forth. The CPU cores 102 may be coupled to one or multiple input/output (I/O) bridges 106, which allow communications between the CPU cores 102 and the BMC 129, as well as communications with various I/O devices, such as storage drives 122; one or multiple network interface controllers (NICs) 124; one or multiple Universal Serial Bus (USB) devices 126; I/O devices; a video controller; and so forth. Moreover, as also depicted in FIG. 1, the computer platform 100 may include one or multiple Peripheral Component Interconnect Express (PCIe) devices 110 (e.g., PCIe expansion cards) that may be coupled to the CPU cores 102 through corresponding individual PCIe bus(es) 108. In accordance with a further example implementation, the PCIe device(s) 110 may be coupled to the I/O bridge(s) 106, instead of being coupled to the CPU cores 102. In accordance with yet further implementations, the I/O bridge(s) 106 and PCIe interfaces may be part of the CPU core 102.

In accordance with example implementations, one or multiple memory modules of the computer platform 100 may form the non-volatile memory 168 that stores the firmware 170. As depicted in FIG. 1, in accordance with some implementations, the non-volatile memory 168 may be coupled by a bus 167 (e.g., a Serial Peripheral Interconnect (SPI) bus) to components of the BMC 129.

In general, the memory devices that form the system memory 104, the firmware memory 168, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, one or multiple NICs 124 of the computer platform 100 may be intelligent input/output peripherals, or "smart I/O peripherals," which may provide backend I/O services for one or multiple applications 115 (or application instances) that execute on the computer platform 100. In accordance with some implementations, one or multiple of the PCIe devices 110 may be smart I/O peripherals.

In accordance with example implementations, the BMC 129 may contain a network interface controller (NIC) 158 (e.g., a semiconductor package or "chip") that allows the BMC 129 to communicate (via the network fabric 188) with entities that are external to the computer platform 100, such as the remote management server 190. The BMC 129 may further contain one or multiple additional communication interfaces 156, such as a USB interface, a PCI interface, an SPI interface, an I³C bus interface, and so forth. Moreover, in accordance with example implementations, the BMC 129 may contain components that are not specifically depicted in FIG. 1, such as a physical memory interface, a memory controller interface, a video controller, and so forth.

Figure 2:
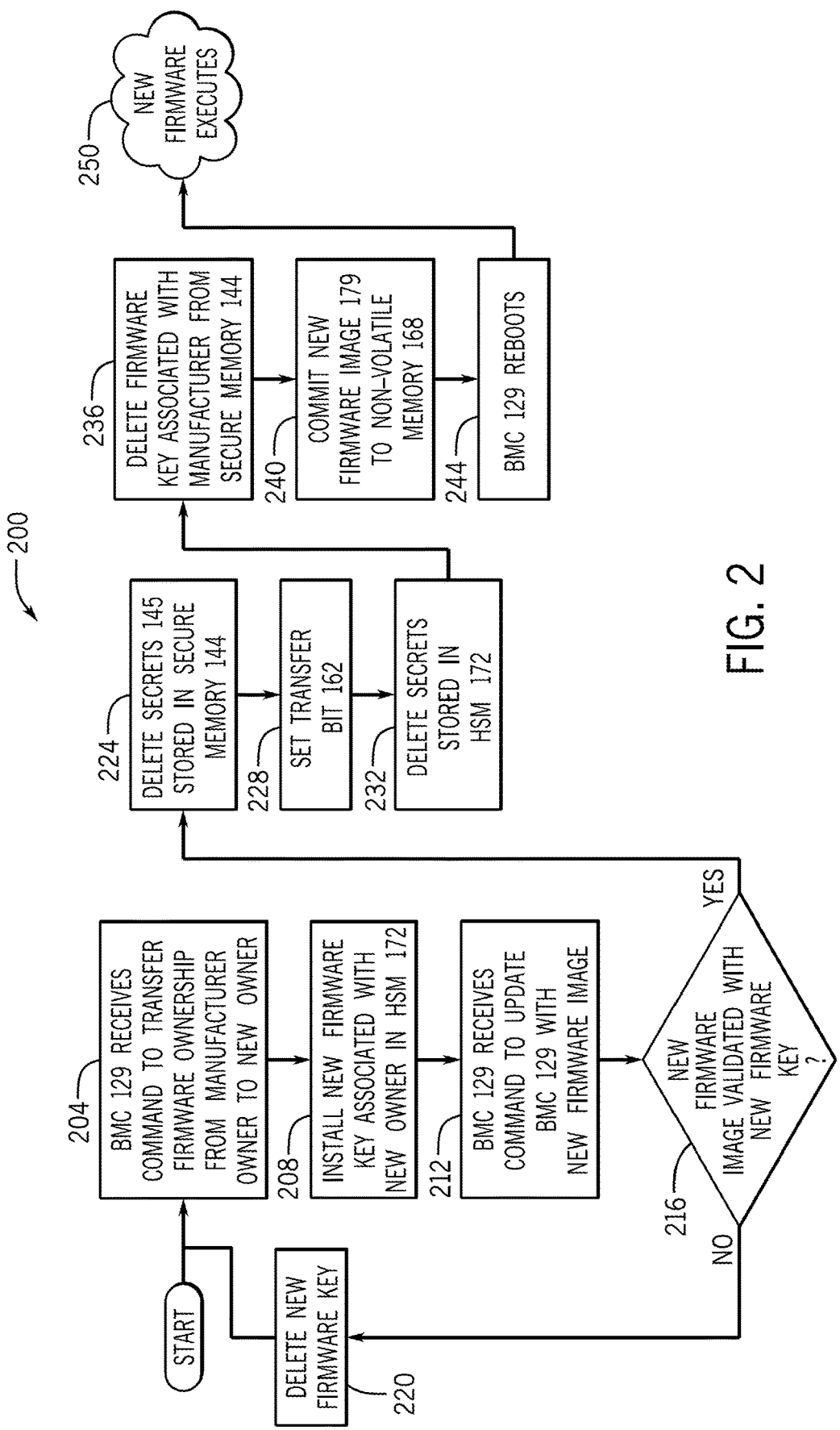
FIG. 2 is a flow diagram depicting a process of the BMC to securely transfer ownership of management firmware executed by the BMC from a computer platform manufacturer owner to another owner and update the transfer bit according to an example implementation.

FIG. 2 depicts a process 200 that may be used by the firmware ownership engine 149 (FIG. 1) and the firmware update engine 147 (FIG. 1) to transfer firmware ownership from the manufacturer to another owner according to an example implementation. Stated differently, in accordance with example implementations, the security processor 142 (FIG. 1) may execute the machine-readable instructions 139 (FIG. 1) for purposes of performing the process 200. Referring to FIG. 2 in conjunction with FIG. 1, in accordance with example implementations, the process 200 includes the BMC 129 receiving (block 204) a command to transfer firmware ownership from the manufacturer owner to a new owner. Pursuant to block 208, the BMC 129 responds to the command by installing a new firmware key that is associated with the new owner (e.g., installs a firmware key owned by the new owner) in the hardware security module 172.

Pursuant to block 212, the BMC 129 receives a command to update the BMC 129 with the new BMC management firmware image. Responsive to this command, the BMC 129 validates the new firmware image. For example, as part of the validation, the BMC 129 may determine a hash value for the new firmware image, decrypt a signature provided with the new firmware image using the new owner firmware key, and compare the decrypted signature with the hash value to determine whether these two values match. In this way, the BMC 129 may determine that the new firmware image is owned by the purported new owner and has not been modified. Pursuant to decision block 216, the BMC 129 determines whether the new firmware image passes the validation. For example, passing the validation may refer to the decrypted signature and the hash value matching.

If the new firmware image does not pass the validation, then, in accordance with example implementations, the BMC 129 deletes (block 220) the new firmware key and terminates the process 200.

If the new firmware image passes the validation, then, in accordance with example implementations, the BMC 129 proceeds with actions to install the new firmware image and protect customer secrets. More specifically, pursuant to block 224, the BMC 129 deletes secrets 145 stored in the secure memory 144. Pursuant to block 228, the BMC 129 sets the transfer bit 162, i.e., changes the transfer bit to a state (e.g., a "1") to indicate that the ownership has been transferred from the manufacturer owner. The BMC 129 further deletes (block 232) any secrets that are stored in the hardware security module 172. The BMC 129 may also delete (block 236) the manufacturer firmware key from the secure memory 144.

Next, pursuant to block 240, the BMC 129 commits the new firmware image 170 to the non-volatile memory 168 and initiates a reboot of the BMC 129, pursuant to block 244. As depicted at reference numeral 250, the BMC 129 may then execute the management firmware corresponding to the new firmware image.

Figure 3:
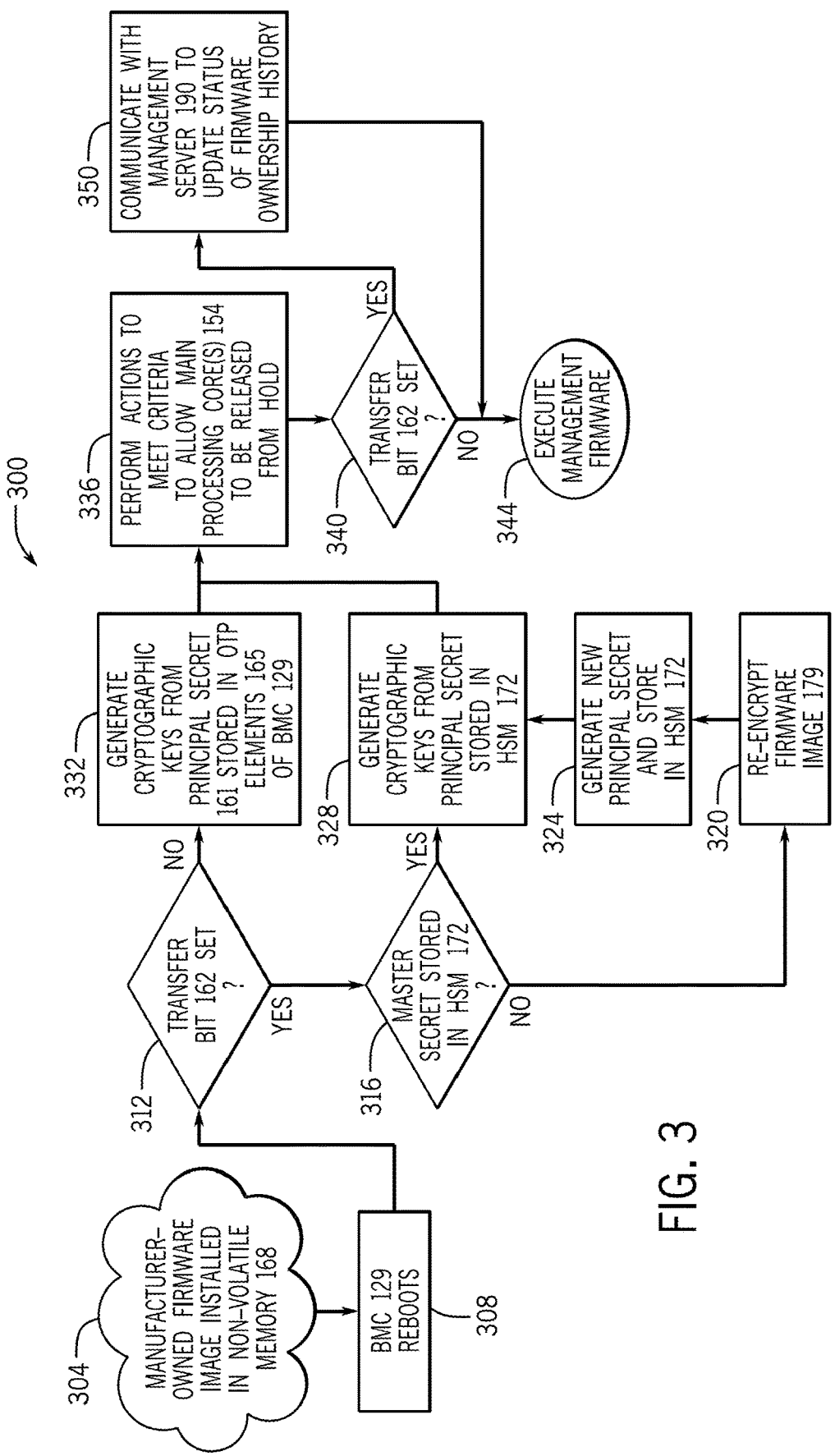
FIG. 3 is a flow diagram depicting a process of the BMC to securely transfer ownership of management firmware executed by the BMC to a computer platform manufacturer owner from another owner according to an example implementation

FIG. 3 depicts a process 300 of the BMC 129, which may be used for purposes of transferring firmware ownership from a non-manufacturer owner to the manufacturer owner according to example implementations. In accordance with example implementations, the process 300 may be performed by the security processor 142 (FIG. 1) of the BMC 129. In accordance with some implementations, as part of performing the process 300, the security processor 142 may execute machine-readable instructions to form the firmware ownership transfer engine 149 (FIG. 1) for purposes of performing the process 300.

Referring to FIG. 3 in conjunction with FIG. 1, preliminarily to the process 300, the customer restores manufacturer-owned firmware (i.e., installs BMC management firmware owned by the manufacturer owner), as indicated at reference numeral 304. The BMC 129 is then re-booted, pursuant to block 308.

Upon boot-up, the BMC 129 determines (decision block 312) whether the transfer bit 162 has been set. If not, the BMC 129 performs actions to manage security assets, such as the principal secret and customer secrets, associated with the BMC 129. More specifically, pursuant to decision block 316, the BMC 129 determines whether the principal secret is already stored in the hardware security module 172. In this manner, via decision block 316, the BMC 129 may determine whether this is the first boot after the new firmware image has been installed, and if so, then the new principal secret has not been generated and stored in the HSM 172. If not, then, pursuant to block 320, the BMC 129 re-encrypts the installed firmware image using a new manufacturer firmware-ownership key. For example, in accordance with some implementations, the currently-installed manufacturer-owned firmware image may be encrypted by a first manufacturer-owned firmware key. Pursuant to block 320, the BMC 129 may, for example, first decrypt the currently-installed firmware image; install a new manufacturer-owned firmware key; encrypt the decrypted firmware image with the new manufacturer-owned firmware owner key and then install (e.g., commit) the newly-encrypted firmware image to the non-volatile memory 168. Pursuant to block 324, the BMC 129 then generates a new principal secret and stores the generated principal secret in the hardware security module 172.

If, pursuant to decision block 316, the BMC 129 determines that the principal secret is already stored in the hardware security module 172, then, the BMC 129 uses the principal secret stored in the hardware security module 172 to generate cryptographic keys, pursuant to block 328. If, pursuant to decision block 312, the BMC 129 determines that the transfer bit has not been set, then, pursuant to block 332, the BMC 129 generates the cryptographic keys from the principal secret 161 stored in the one-time programmable elements 165.

Pursuant to block 336, the BMC 129 may then proceed with actions related to the startup of the BMC 129. For example, in accordance with some implementations, the BMC 129 may validate firmware (as described herein), perform security checks, perform fault checks, and so forth; and if criteria related to these actions are met, then the BMC 129 releases the main processing cores 154 from reset so that the cores 154 may begin executing the firmware management stack. Pursuant to decision block 340, the BMC 129 determines whether the transfer bit 162 has been set, and if so, the BMC 129 may communicate the status of the firmware ownership transfer history to the remote management server 190. This notification may take on any of a number of different forms, such as, for example, an update to a graphical user interface (GUI) of the remote management server 190, the sending of a message to the remote management server 190, and so forth. The main processing cores 154 of the BMC 129 may then execute the management firmware, pursuant to block 344.

Other implementations are contemplated, which are within the scope of the appended claims. For example, in accordance with further implementations, a management controller other than a BMC may store a history of firmware ownership and manage transfer of firmware ownership, as described herein. For example, in accordance with further implementations, the management controller may be a platform controller or a chassis controller. Although the foregoing description discusses the first, or initial, owner of the management firmware as being a manufacturer of the computer platform, in accordance with further implementations, the initial owner of the management firmware may be an owner other than a manufacturer of the computer platform. Therefore, in general, in accordance with example implementations, the management controller may maintain a history of ownership of the management firmware and manage the use of the principal secret (as well as manage other secrets as described herein), regardless of the specific entity that is the initial owner.

Figure 4:
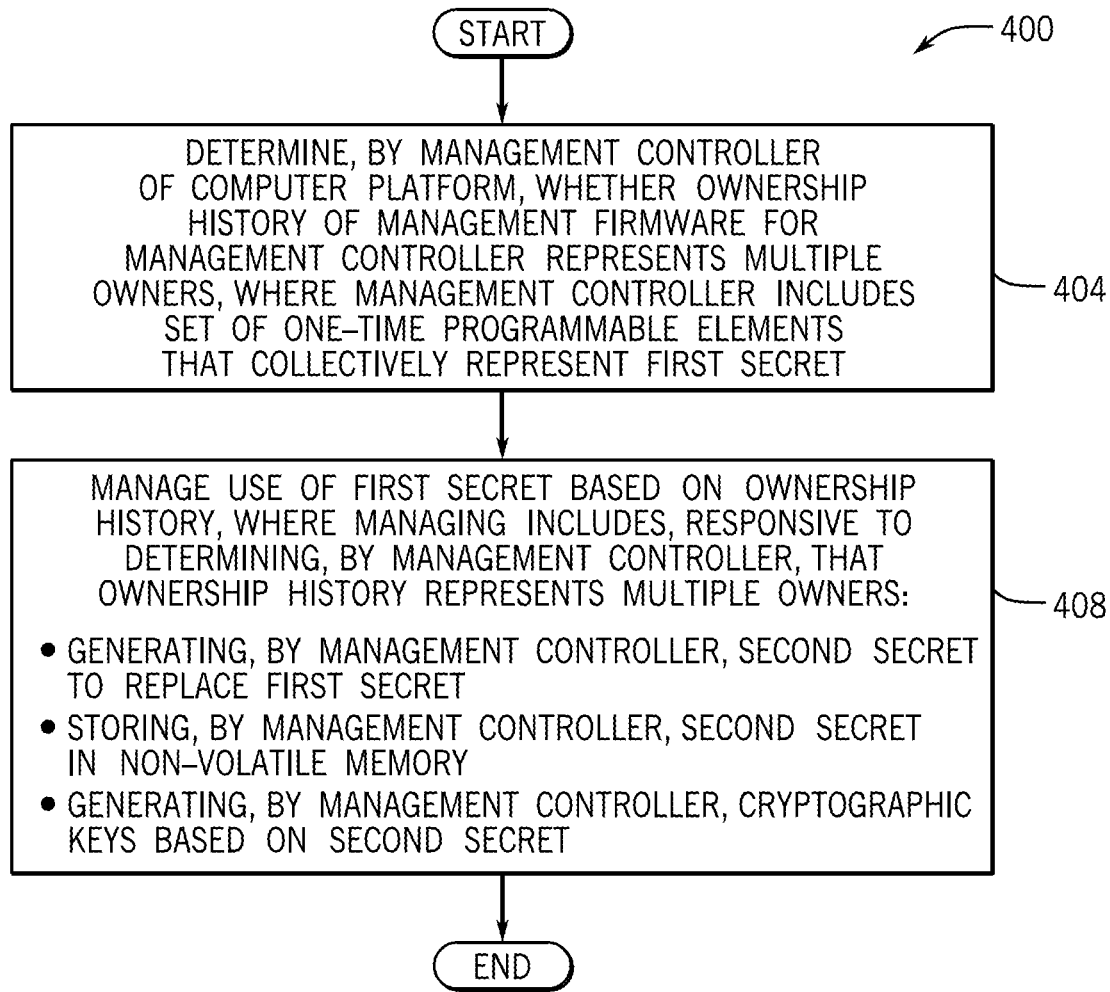
FIG. 4 is a flow diagram depicting a process to manage use of a secret of a management controller based on a firmware ownership history according to an example implementation.

Referring to FIG. 4, in accordance with example implementations, a process 400 includes determining (block 404), by a management controller of a computer platform, whether an ownership history of management firmware for the management controller represents multiple owners. The management controller includes a set of one-time programmable elements that represent a first secret. The process 400 includes managing (block 408) use of the first secret based on the ownership history. The managing includes, responsive to determining, by the management controller, that the ownership history represents multiple owners, generating, by the management controller, a second secret to replace the first secret. The management includes, responsive to determining that the ownership history represents multiple owners, storing, by the management controller, the second secret in a non-volatile memory, and generating, by the management controller, cryptographic keys based on the second secret.

Figure 5:
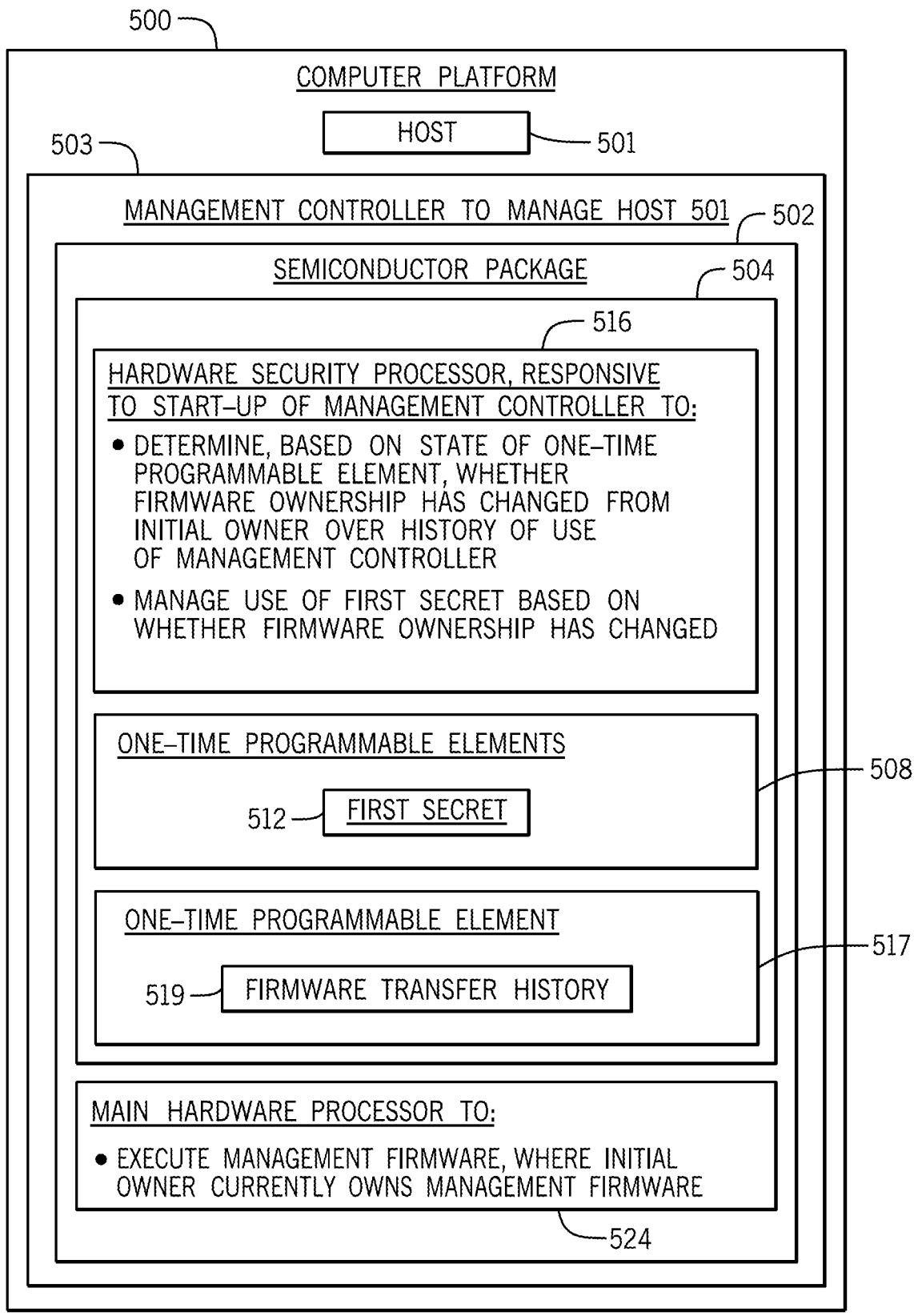
FIG. 5 is a schematic diagram of a management controller that manages use of a secret of the management controller based on a firmware ownership history according to an example implementation.

Referring to FIG. 5, in accordance with example implementations, a computer platform 500 includes a host 501 and a management controller 503 to manage the host 501. The management controller 503 includes a semiconductor package 502. The semiconductor package 502 includes first one-time programmable elements 508; a second one-time programmable element 517; a main hardware processor 524; and a hardware security processor 516. The first one-time programmable elements 508 represent a first secret 512, and the second one-time programmable element 517 represents a firmware transfer history 519, i.e., whether an ownership of management firmware that is executed by the management controller 503 has changed from an initial owner to another owner over a history of use of the management controller 503. The main hardware processor 524 executes the management firmware. The initial owner currently owns the management firmware. The security processor 516 to, responsive to a start-up of the management controller, determines, based on the second data, whether the firmware ownership has changed from the initial owner over the history of use, and manages use of the first secret 512 based on whether the ownership of the management firmware has changed.

Referring to FIG. 6, in accordance with an example implementation, a non-transitory machine-readable storage medium 600 stores machine-executable instructions 604. The instructions 604, when executed by a machine, cause the machine to cause a baseboard management controller of the machine to determine whether a history of ownership of firmware stored in the baseboard management controller represents a change in the ownership from an initial owner to another owner over history of use of the baseboard management controller. The firmware corresponds to a management stack of the baseboard management controller. The instructions 604, when executed by the machine, further cause the machine to cause the baseboard management controller to manage use of a first secret based on the history of ownership of the firmware. The first secret is represented by one-time programmable elements of the machine. Managing the use of the first secret includes, responsive to determining that the ownership of the firmware has been owned by the first owner over the history without the ownership being transferred, generating cryptographic keys based on the first secret. Managing the use of the first secret further includes, responsive to determining that the ownership has been transferred during the history, generating the cryptographic keys based on a second secret, which is stored in a secure memory.

In accordance with example implementations, the management controller may determine whether the ownership history represents multiple owners based on a state of a one-time programmable element. A particular advantage is that the BMC may manage secrets based on a persistent firmware ownership history.

In accordance with example implementations, the baseboard management controller determines whether the second secret is stored in the non-volatile memory. The baseboard management controller may generate the second secret responsive to determining that the second secret is not stored in the non-volatile memory. A particular advantage is that the BMC may manage secrets based on a persistent firmware ownership history.

In accordance with example implementations, firmware image is encrypted by a first cryptographic key. The baseboard management controller re-encrypts the firmware image with a second cryptographic key other than the first cryptographic key responsive to the baseboard management controller determining that the second secret is not stored in the non-volatile memory. A particular advantage is that the BMC may manage secrets based on a persistent firmware ownership history.

In accordance with example implementations, the baseboard management controller, responsive to determining that the ownership history represents multiple owners, generates a notification of a firmware ownership transfer, and communicates the notification to a remote management server. A particular advantage is that the BMC may manage secrets based on a persistent firmware ownership history.

In accordance with example implementations, the hardware security processor receives a command to transfer the ownership from the initial owner to a second owner. Responsive to the command, the security processor installs a firmware image that is associated with the initial owner and programs the second-time programmable element to represent that the ownership is transferred. A particular advantage is that the BMC may manage secrets based on a persistent firmware ownership history.

In accordance with example implementations, the computer platform further includes a secure memory. The hardware security processor receives a command to transfer the ownership from the initial owner to a second owner. Responsive to the command, the hardware security processor validates a firmware image based on a cryptographic key that is associated with the second owner. Responsive to the validation of the firmware image, the hardware security processor removes secrets that are stored in the secure memory. A particular advantage is that the BMC may manage secrets based on a persistent firmware ownership history.

In accordance with example implementations, the computer platform further includes a non-volatile memory. The hardware security processor is to further, responsive to the validation of the firmware and the removal of the secrets stored in the secure memory, store the firmware image in the non-volatile memory. A particular advantage is that the BMC may manage secrets based on a persistent firmware ownership history.

In accordance with example implementations, the hardware security processor is to further initiate a reboot of the management controller to the firmware image being stored in the non-volatile memory. A particular advantage is that the BMC may manage secrets based on a persistent firmware ownership history.

In accordance with example implementations, the hardware security processor is to further receive a command to install a firmware image that is associated with a second owner other than the initial owner. The hardware security processor validates the firmware image based on a cryptographic key that is associated with the second owner, and the hardware security processor, responsive to the validation of the firmware image failing, deletes the cryptographic key. A particular advantage is that the BMC may manage secrets based on a persistent firmware ownership history.

In accordance with example implementations, the hardware security processor, responsive to a boot of the management controller, determines, based on a state of the first one-time programmable element, whether the ownership has changed, and responsive to determining that the ownership has not changed, generate cryptographic keys based on the first secret. A particular advantage is that the BMC may manage secrets based on a persistent firmware ownership history.

In accordance with example implementations, the computer platform further includes a secure memory. The hardware security processor determines, based on a state of the first one-time programmable element, whether the ownership has changed. The hardware security processor, responsive to determining that the ownership has changed, generates a second secret to replace the first secret, stores the second secret in the secure memory, initiates a reboot of the management controller, and responsive to the reboot, generates cryptographic keys that are based on the second secret. A particular advantage is that the BMC may manage secrets based on a persistent firmware ownership history.

In accordance with example implementations, the computer platform further includes a secure memory. The hardware security processor to determine, based on a state of the first one-time programmable element, whether the ownership has changed. The hardware security processor, responsive to determining that the ownership has changed, deletes secrets that are stored in the secure memory, generates a second secret in place of the first secret, stores the second secret in the secure memory, initiates a reboot of the management controller, and in response to the reboot, generates cryptographic keys that are based on the second secret. A particular advantage is that the BMC may manage secrets based on a persistent firmware ownership history.

In accordance with example implementations, the management controller includes a baseboard management controller. Moreover, the management controller managing the host includes providing, by the baseboard management controller, a function to allow a remote management server to remotely control functions of the host. A particular advantage is that the BMC may manage secrets based on a persistent firmware ownership history.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A computer platform comprising:
   a host; and
   a management controller to manage the host, wherein the management controller comprises a semiconductor package and the semiconductor package comprises:
      first one-time programmable memory elements to represent a first secret;
      a second one-time programmable element to provide a representation whether an ownership of management firmware executed by the management controller has changed from an initial owner to another owner over a history of use of the management controller;
      a main hardware processor to execute the management firmware, wherein the initial owner currently owns the management firmware; and
      a hardware security processor to, responsive to a start-up of the management controller:
         determine, based on the representation, whether the firmware ownership has changed from the initial owner over the history of use of the management controller; and
         regulate whether the management controller derives a given cryptographic key from the first secret based on the determination of whether the firmware ownership has changed from the initial owner over the history of use of the management controller.

2. The computer platform of claim 1, wherein the hardware security processor to further:
   receive a command to transfer the ownership from the initial owner to a second owner; and
   responsive to the command, install a firmware image associated with the second owner and program the second one-time programmable element to represent that the ownership being transferred to the second owner.

3. The computer platform of claim 1, wherein the hardware security processor to further:
   receive a command to install a firmware image associated with a second owner other than the initial owner;
   validate the firmware image based on a second cryptographic key associated with the second owner; and
   responsive to the validation of the firmware image failing, delete the second cryptographic key.

4. The computer platform of claim 1, wherein the hardware security processor to further, responsive to the start-up of the management controller:
   responsive to determining that the firmware ownership has not changed from the initial owner over the history of use of the management controller, apply a key generation algorithm to the first secret to generate the given cryptographic key.

5. The computer platform of claim 1, wherein the computer platform further comprises a secure memory, and the hardware security processor to further:
   responsive to determining that the firmware ownership has changed from the initial owner over the history of use of the management controller, generate a second secret to replace the first secret, store the second secret in the secure memory, initiate a reboot of the management controller, and responsive to the reboot, generate the given cryptographic key based on the second secret.

6. The computer platform of claim 1, wherein the computer platform further comprises a secure memory and the hardware security processor to further:
   responsive to determining that the firmware ownership has changed from the initial owner over the history of use of the management controller:
      delete secrets stored in the secure memory, wherein the secrets include the first secret;
      generate a second secret to replace the first secret;
      store the second secret in the secure memory;
      initiate a reboot of the management controller; and
      in response to the reboot, generate the given cryptographic key based on the second secret.

7. The computer platform of claim 1, wherein the management controller comprises a baseboard management controller, and the management controller managing the host comprises providing, by the baseboard management controller, a function to allow a remote management server to remotely control functions of the host.

8. The computer platform of claim 1, wherein the given cryptographic key comprises an initial device identifier (IDevID) key.

9. The computer platform of claim 1, wherein the management controller regulates whether a key generation algorithm is applied to the first secret based on the determination of whether the firmware ownership has changed from the initial owner over the history of use of the management controller.

10. The computer platform of claim 1, wherein the first secret comprises a principal secret from which, if the firmware ownership has not changed from the initial owner over the history of use of the management controller, other secrets are derived.

11. The computer platform of claim 1, wherein the computer platform further comprises a secure memory, and the hardware security processor to further:
   receive a command to transfer the ownership from the initial owner to a second owner;
   responsive to the command, validate a firmware image based on a second cryptographic key associated with the second owner; and responsive to the validation of the firmware image, remove secrets stored in the secure memory.

12. The computer platform of claim 11, wherein the computer platform further comprises a non-volatile memory, and the hardware security processor to further:

responsive to the validation of the firmware image and the removal of the secrets stored in the secure memory, store the firmware image in the non-volatile memory.

13. The computer platform of claim 12, wherein the hardware security processor to further initiate a reboot of the management controller responsive to the firmware image being stored in the non-volatile memory.

\* \* \* \* \*